United States Patent [19]

Burgoyne, Jr. et al.

[11] Patent Number: 4,897,092
[45] Date of Patent: Jan. 30, 1990

[54] POLYIMIDE MEMBRANE HAVING IMPROVED FLUX

[75] Inventors: William F. Burgoyne, Jr., Emmaus; Michael Langsam, Allentown, both of Pa.

[73] Assignee: Air Products and Chemicals, Inc., Allentown, Pa.

[21] Appl. No.: 316,214

[22] Filed: Feb. 27, 1989

[51] Int. Cl.$^4$ .............................................. B01D 53/22
[52] U.S. Cl. ................................. 55/16; 55/68; 55/158
[58] Field of Search .................... 55/16, 68, 158; 210/500.39

[56] References Cited

U.S. PATENT DOCUMENTS

| | | | |
|---|---|---|---|
| Re. 30,351 | 7/1980 | Hoehn et al. | 55/16 |
| 3,822,202 | 7/1974 | Hoehn et al. | 210/23 |
| 4,156,597 | 5/1979 | Browall | 55/16 |
| 4,378,400 | 3/1983 | Makino et al. | 55/158 X |
| 4,440,643 | 4/1984 | Makino et al. | 55/158 X |
| 4,474,662 | 10/1984 | Makino et al. | 55/158 X |
| 4,512,893 | 4/1985 | Makino et al. | 55/158 X |
| 4,528,004 | 7/1985 | Makino et al. | 55/158 |
| 4,690,873 | 9/1987 | Makino et al. | 55/158 X |
| 4,705,540 | 11/1987 | Hayes | 55/16 |
| 4,717,393 | 1/1988 | Hayes | 55/16 |
| 4,717,394 | 1/1988 | Hayes | 55/16 |
| 4,746,474 | 5/1988 | Kohn | 210/500.39 X |
| 4,838,900 | 6/1989 | Hayes | 55/16 |

FOREIGN PATENT DOCUMENTS

| | | | |
|---|---|---|---|
| 61-103521 | 5/1986 | Japan | 55/158 |
| 63-028424 | 2/1988 | Japan | 55/158 |

OTHER PUBLICATIONS

M. Salame, "Prediction of Gas Barrier Properties of High Polymers", Poly. Eng. Sci., vol. 26, pp. 1543–1546, No. 22 (1986).

P. H. Kim et al, "Reverse Permselectivity" of $N_2$ over $CH_4$ in Aromatic Polyimides, J. Appl. Poly. Sci., vol. 34, pp. 1767–1771 (1987).

*Primary Examiner*—Robert Spitzer
*Attorney, Agent, or Firm*—Mark L. Rodgers; William F. Marsh; James C. Simmons

[57] ABSTRACT

The present invention is a class of polyimide membranes wherein the diamine portion of the polymer structure is an alkylated bisaniline. The bridging group of the diamine possesses restricted, rotatable rigid, or low Van Der Waal energy substituents which are orthogonal to the polymer backbone. These polyamide membranes exhibit enhanced gas flux and are useful in various gas separation applications.

11 Claims, No Drawings

POLYIMIDE MEMBRANE HAVING IMPROVED FLUX

TECHNICAL FIELD

The present invention relates to polyimide membranes and the use of such membranes for separating one or more gaseous components from a gas mixture.

BACKGROUND OF THE INVENTION

There is a need for improved polymeric materials that are highly permeable, yet may under certain circumstances, provide selective separation of various gas combinations. Such materials would especially be useful in commercial, non-cryogenic gas separation processes.

The commercial application for gas separation devices based on polymeric materials relies, in part, on maximizing the overall gas flux through the membrane. P. H. Kim, et al., J. Appl. Poly. Sci., 34 1761 (1987), reported that the gas flux for a membrane is relatable to the average space between the polymer chains. In addition, they indicated that the density of the polymer is also related to the overall gas flux. The problem, in part, for these commercial applications is to identify polymers with very high flux and with good thermomechanical properties. It has generally been observed that to achieve high overall flux requires having a polymer with low chain-chain interactions. This can be exemplified by polymers such as poly(dimethylsiloxane) or poly(4-methyl-1-pentene). These materials have rather high gas flux values. These high flux materials have, because of their low chain-chain interaction, low glass transition temperatures (Tg). As a consequence, these materials require either special processing conditions to build in chemical and physiochemical crosslinking or they can be used only at rather low application temperatures. By contrast, polymers with strong chain-chain interactions have rather high Tg values and have usually exhibited rather low gas flux.

Polyimides, which generally have strong chain-chain interactions and have high Tg values, have been reported to have good gas flux values for certain specific structures. Specifically, U.S. Pat. No. 3,822,202 (1974); Re 30,351 (1980) discloses a process for separating fluids using a semi-permeable membrane made from polyimides, polyesters or polyamides. The repeating units of the main polymer chain of these membranes are distinguished in that such repeating units have at least one rigid divalent subunit, the two main chain single bonds extending from which are not colinear, is sterically unable to rotate 360° around at least one of these bonds, and has 50% or more of its main chain atoms as members of aromatic rings.

U.S. Pat. No. 4,705,540 discloses a highly permeable aromatic polyimide gas separation membrane and processes for using said membrane. The membrane is an aromatic polyimide membrane in which the phenylenediamines are rigid and are substituted on essentially all of the positions ortho to the amino substituents, and the acid anhydride groups are essentially all attached to rigid aromatic moieties.

U.S. Pat. Nos. 4,717,393 and 4,717,394 teach polymeric membranes and processes using the membranes for separating components of the gas mixture. The membranes disclosed in both of these patents are semi-flexible, aromatic polyimides, prepared by polycondensation of dianhydrides with phenylenediamines having alkyl substituents on all ortho positions to the amine functions, or with mixtures of other, non-alkylated diamines, some components have substituents on all positions ortho to the amine functions. It is taught that the membranes formed from this class of polyimides exhibit improved environmental stability and gas permeability, due to the optimization of the molecular free volume in the polymer. It is also taught that such membranes can be photochemically crosslinked, which in some instances results in a better performing membrane.

U.S. Pat. No. 4,378,400 discloses gas separation membranes formed from aromatic polyimides based upon biphenyltetra-carboxylic dianhydride for separating various gas mixtures.

M. Salame in Poly. Eng. Sci., 26 1543 (1986) developed a predictive relationship for oxygen permeability coefficient [(PO)] and polymer structure. In the publication he demonstrates the group constitutions of various structural portions of a polymer to $P(O_2)$ values. In particular he indicates the presence of an aromatic group, such as phenyl, in place of a methylene ($-CH_2-$) decreases the $P(O_2)$ values for a pair of comparative polymers.

BRIEF SUMMARY OF THE INVENTION

The present invention is a class of improved polyimide membranes and processes for using said membranes to separate one or more components of a gas mixture. The polyimide membranes of the present invention are distinguishable in that the diamine portion of the polymer structure can be described as alkylated bisanilines whereby the bridging group possesses restricted, rotatable rigid, or low Van Der Waal energy substituents which are orthogonal to the polymer backbone. Such bridging groups exhibit restricted central rotational properties about the bridging group, thereby enhancing polymer chain spacing, and as a result, overall gas flux.

These polyimide membranes are particularly useful in applications for the separation of oxygen from nitrogen or air.

DETAILED DESCRIPTION OF THE INVENTION

The present invention is a new class of polyimide-based membranes which exhibit enhanced gas separation properties. The membranes are formed of polyimides in which the diamine portion of the polymer structure is an alkylated bisaniline having a bridging group which possesses restricted, rotatable rigid, or low Van Der Waal energy substituents orthogonal to the polymer backbone. It has been found that the presence of certain combinations of proper bridging groups, along with the steric effects of the alkyl groups ortho to the amine functions, results in increased $O_2$ permeability, increased average main chain spacing and decreased average polymer density. It is these properties which make the polyimide membranes of the present invention superior high flux gas separation membranes than those of the prior art.

The membranes of the present invention are characterized in that they are formed of a polyimide containing polymerizable units of the formula:

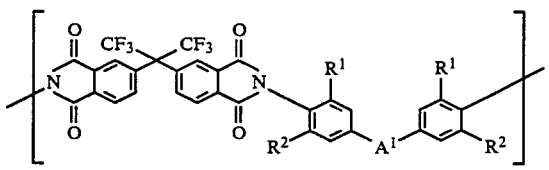

where
each $R^1$ is independently H, $C_1$–$C_6$ alkyl, or 1-arylalkyl;
each $R^2$ is independently $C_1$–$C_6$ alkyl, aryl, perhaloalkyl, or 1-arylalkyl; and
$A^1$ is a single bond,

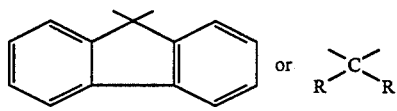

wherein: each R is independently H, $CF_3$, $CF_2Cl$, $C_1$–$C_6$ alkyl, phenyl, substituted phenyl or a halogen. The preferred alkyl substituents for $R^1$ and $R^2$ being methyl, isopropyl or t-butyl and the preferred bridging groups (i.e., $A^1$), when high oxygen permeance is desired, being fluorenyl, 1-phenyl-2,2,2-trifluoroethenyl, or other aromatic containing groups.

The membrane may be formed by a polyimide having only the above structural units, or may be copolymerized with other polyimide structures. Preferred polyimide structural units which may be copolymerized with units of the above formula can be generally represented by the formula:

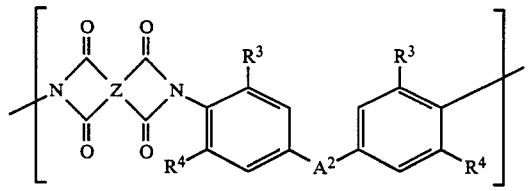

where
each $R^3$ is independently H, $C_1$–$C_6$ alkyl, or 1-arylalkyl;
each $R^4$ is independently $C_1$–$C_6$ alkyl, aryl, perhaloalkyl, or 1-arylalkyl;
$A^2$ is a single bond,

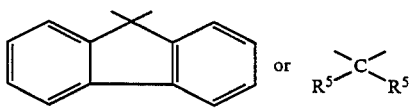

wherein
each $R^5$ is independently H, $CF_3$, $CF_2Cl$, $C_1$–$C_6$ alkyl, phenyl, substituted phenyl or a halogen; and
Z is

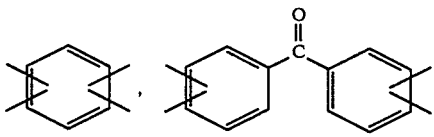

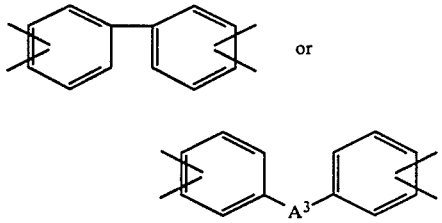

wherein $A^3$ is $C(CH_3)_2$, O, S or $SO_2$.

In any of the above structures, when any of $R^1$–$R^4$ are 1-arylalkyl, it is preferred that such groups are either 1-arylethyl or 1-aryl-1-methylethyl.

In addition to the above polyimide structures, minor amounts of other monomer units may be present which do not affect the gas separation properties of the resultant membrane.

The polyimide membranes of the present invention are useful in gas separation applications, especially for the recovery of oxygen from an $O_2/N_2$ stream or from air. The gas mixture to be separated is simply brought into contact with the membrane whereby one or more components is selectively permeated through the membrane. The structures of the polyimide membranes of the present invention provide for a high gas flux through the membrane while maintaining a polymeric structure having a high glass transition temperature (Tg). While the polyimide membranes of the prior art, such as U.S. Pat. Nos. 4,705,540 and 4,717,394 also had high Tg's and were specifically taught for gas separation, the polyimide membranes of the present invention, having the alkylated bisaniline diamine structures as set out above, exhibit high flux rates for various gases, especially oxygen.

W. J. Koros et al, J. Memb. Sci., 37, 45 (1988) taught that the parameters of d-spacing (as determined by wide angle X-ray scatter techniques) and density (as determined by mercury pycnometry techniques) can be used to characterize polyimide films. They have indicated that as the oxygen permeability increased in a series of test films, the corresponding measurement of d-spacing increased and the overall density decreased.

The following examples are presented to better illustrate the present invention and are not meant to be limiting.

EXAMPLE 1

Preparation of Bis[3-(trifluoromethyl)-4-aminophenyl]methane

A 77.22 g portion of 37% aqueous hydrochloric acid (0.7839 mol of acid) was slowly added to 300 g of water followed by 136.96 g (0.850 mol) of 2-aminobenzotrifluoride. With vigorous stirring, 33.45 g of 37% aqueous formaldehyde (0.4126 mole) was added dropwise over 15 min. The temperature rose to 40° C. After an additional 0.5 hr., the solution was heated to 90° C. for 3 hrs. The solution was cooled to room temperature then neutralized with a solution of 36.0 g (0.90 mol) of sodium hydroxide in 50 mL of water. The reaction mixture was extracted with three 250 mL portions of toluene. Toluene and excess 2-aminobenzotrifluoride were removed from the toluene extracts via distillation under reduced pressure. The residual crude product was initially purified by bulb-to-bulb distillation (ca. 160° C./0.1 mmHg) then recrystallized from ether/hexane. This procedure afforded 60.2 g (43.6% yield) of polymer grade diamine with a melting point of 84°–88° C.

EXAMPLES 2–8

Preparation of 9,9-Bis(4-aminoaryl)fluorenes

The following general procedure was used to prepare the 9,9-bis(4-aminoaryl)fluorenes. Specific product yields and physical properties are outlined in Table 1. All compounds provided satisfactory spectral and elemental analysis.

A 50.00 g (0.333 mol) portion of trifluoromethanesulfonic acid was slowly added to 1.75 moles of the arylamine contained in a one liter, three necked flask with mechanical stirring. After thorough mixing had occurred, 45.00 g (0.250 mol) of 9-fluorenone was added. The mixture was then heated to 155° C. for 17 hrs. under an atmosphere of nitrogen with continuous stirring. After which time, the reaction vessel was fitted with a Claisen distillation head and the excess arylamine along with some of the acid were removed via vacuum distillation. The residual product was cooled below 80° C. then neutralized with a solution of 40.0 g (1.00 mol) of sodium hydroxide in 200 mL of water. The crude 9,9-bis(4-amino aryl)fluorine was then isolated by either vacuum filtration of the precipitate or by extraction with several 800 mL volumes of toluene. Polymer grade diamine was obtained after recrystallization followed by vacuum drying at ca. 80°–100° C./5 mm Hg for 24 hours.

TABLE 1
Preparation of Bis(aminoaryl)fluorene

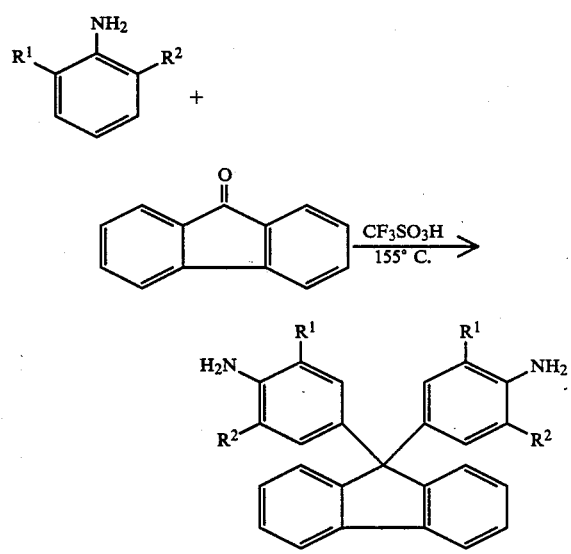

| Example | Diamine R$^1$ | R$^2$ | Solvent | % Isolated Yield | mp °C. |
|---|---|---|---|---|---|
| 2 | H | H | toluene | 55.7 | 227–230 |
| 3 | CH$_3$ | CH$_3$ | toluene | 50.5 | >250 |
| 4 | H | CH(CH$_3$)$_2$ | toluene | 90.3 | 222–225 |
| 5 | CH$_3$ | CH(CH$_3$)$_2$ | toluene | 35.6 | 238–241 |
| 6 | H | F | ethylacetate/toluene | 45.0 | 247–250 |
| 7 | H | Cl | toluene/hexane | 23.4 | 197–200 |
| 8 | H | C$_6$H$_5$ | ethylacetate/toluene | 84.7 | >250 |

EXAMPLES 9–12

Preparation of 1,1-Bis(4-aminoaryl)-1-phenyl-2,2,2-trifluoroethanes

The following general procedure was used to prepare the 1,1-bis(4-aminoaryl)-1-phenyl-2,2,2-trifluoroethanes. Specific product yields and physical properties are outlined in Table 2. All compounds provided satisfactory spectral and elemental analyses.

A 50.00 g (0.333 mol) portion of trifluoromethanesulfonic acid was slowly added to 1.75 mol of the arylamine contained in a one liter, three-necked flask with mechanical stirring. After thorough mixing had occurred, 43.53 g (0.250 mol) of 1,1,1-trifluoroacetophenone was added. The mixture was then heated to 155° C. for 17 hours under an atmosphere of nitrogen with continuous stirring. After which time, the reaction vessel was fitted with a Claisen distillation head and the excess arylamine along with some of the acid were removed via vacuum distillation. The residual product was cooled below 80° C. then neutralized with a solution of 40.0 g (1.00 mol) of sodium hydroxide in 200 mL of water. A 800 g portion of toluene was then added with vigorous stirring. After 5 min., stirring was discontinued and the layers were separated. The organic layer was dried over anhydrous magnesium sulfate then the toluene was evaporated. Polymer grade diamine was obtained from the residue after recrystallization followed by vacuum drying at 80°–100° C./5 mm Hg for 24 hours.

TABLE 2
Preparation of 1,1-Bis(4-aminoaryl)-1-phenyl-2,2,2-trifluoroethanes

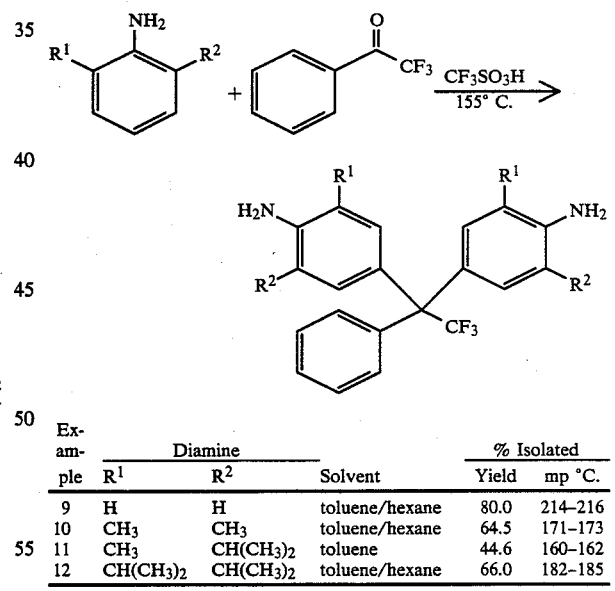

| Example | Diamine R$^1$ | R$^2$ | Solvent | % Isolated Yield | mp °C. |
|---|---|---|---|---|---|
| 9 | H | H | toluene/hexane | 80.0 | 214–216 |
| 10 | CH$_3$ | CH$_3$ | toluene/hexane | 64.5 | 171–173 |
| 11 | CH$_3$ | CH(CH$_3$)$_2$ | toluene | 44.6 | 160–162 |
| 12 | CH(CH$_3$)$_2$ | CH(CH$_3$)$_2$ | toluene/hexane | 66.0 | 182–185 |

EXAMPLES 13–33

Preparation of Polyimides by Condensing 6F-Dianhydride with Bisanilines

General Procedure

The following procedures were used to prepare polyimides by condensing 5,5'-[2,2,2-trifluoro-1-(trifluoro methyl)ethylidine]bis-1,3-isobenzofuranedione (6F-dianhydride) with the bisanilines indicated in Tables 3 through 6. Variations in polymerization reaction parameters between the different bisanilines reflect the specific conditions required to obtain good, film-forming polyimides.

Polyamic Acid Preparation

A 20.000 g (0.04502 mol) portion of 6F-dianhydride is added proportionately through the course of 0.5 hr. to a solution of 0.04502 mol of the bisaniline in anhydrous N,N-dimethyl acetamide (DMAC). During the addition, the mixture is being stirred mechanically under an inert nitrogen blanket. The initial reaction temperature for a given bisaniline is indicated in Tables 3–6. The amount of DMAC used is determined by the percent solids concentration indicated in Tables 3–6. Approximately one hour after the addition of dianhydride, the reaction temperature is brought to 25° C. and the reaction mixture is stirred for the indicated reaction time.

This polyamic acid solution is used directly in preparing the corresponding polyimide solution.

Polyimide Preparation

The solids concentration of the polyamic acid solution was adjusted with DMAC values indicated in Tables 3–6. Acetic anhydride (9.18 g, 0.0900 mol) and 2.27 g (0.0225 mol) of triethylamine were added to the polyamic acid solution. The solution was then heated to 60° C. for 3 hours with stirring. After cooling, the polyimide solution was cast on glass plates. Polyimide films of ca. 100 micron thickness were obtained after vacuum drying at 70° C./200 mm Hg for 8 hours, then 100° C./0.5 mmHg for 16 hrs. followed by 225° C. at 0.1 mmHg for 8 hours. The polyimide films obtained after this drying procedure were determined to contain less than 0.5 wt% residual DMAC.

The results for examples 13–33 are reported in Tables 3–6 below.

TABLE 3

Polyimide Preparation from Bis(4-Aminoaryl)Methanes

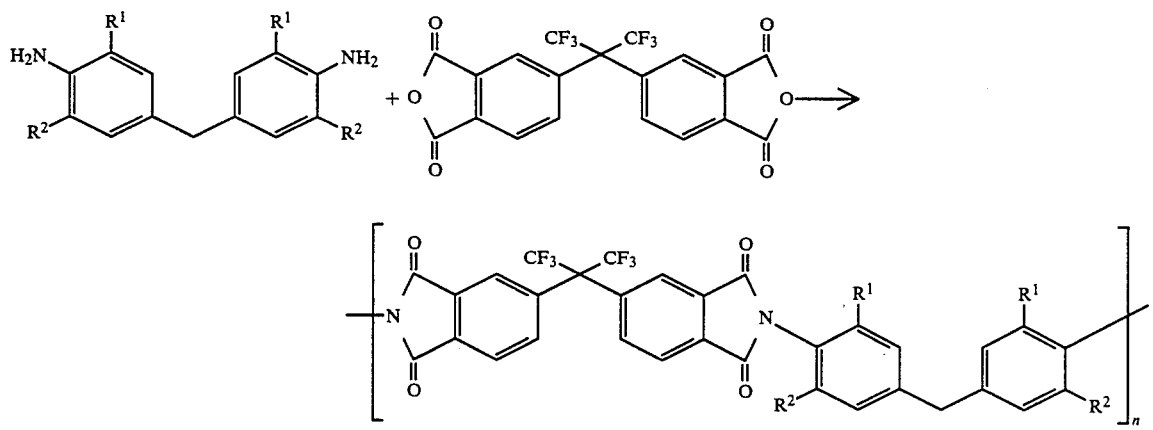

| Example | $R^1$ | $R^2$ | Initial Reaction Temp(°C.) | Polyamic Acid Reaction Time(hr) | % Solids Polyamic Acid Solution | % Solids Polyimide Solution | Polyimide Film Tg | Polyimide Film Inh. Visc. | Polyimide Film d-spacing | Polyimide Film Density |
|---|---|---|---|---|---|---|---|---|---|---|
| 13 | H | H | −10 | 17 | 20 | 10 | 289 | .975 | 5.51 | 1.55 |
| 14 | H | $CH(CH_3)_2$ | 25 | 17 | 15 | 7 | — | — | 6.17 | — |
| 15 | H | $C(CH_3)_3$ | 25 | 17 | 34 | 25 | 274 | — | — | — |
| 16 | H | $CF_3$ | 25 | 41 | 45 | — | — | — | — | — |
| 17 | $CH_3$ | $CH_3$ | −10 | 17 | 20 | 10 | 299 | .480 | 5.93 | 1.40 |
| 18 | $C_2H_5$ | $C_2H_5$ | −10 | 17 | 21 | 10 | — | — | 6.35 | 1.29 |
| 19 | $CH_3$ | $CH(CH_3)_2$ | −10 | 17 | 20 | 10 | 276 | .894 | 6.35 | 1.27 |
| 20 | $CH(CH_3)_2$ | $CH(CH_3)_2$ | −10 | 17 | 20 | 10 | 275 | .790 | 6.58 | 1.20 |

TABLE 4

Polyimide Preparation from 9,9-Bis(4-aminoaryl)fluorene

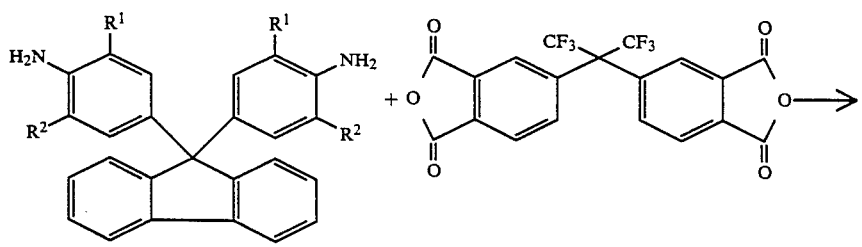

TABLE 4-continued

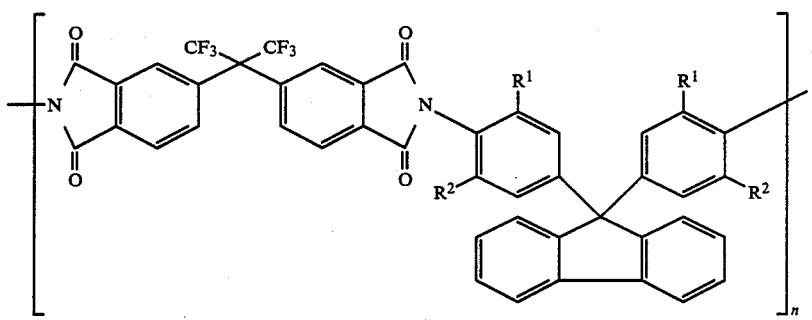

| Example | R[1] | R[2] | Initial Reaction Temp(°C.) | Polyamic Acid Reaction Time(hr) | % Solids Polyamic Acid Solution | % Solids Polyimide Solution | Polyimide Film Tg | Polyimide Film Inh. Visc. | Polyimide Film d-spacing | Polyimide Film Density |
|---|---|---|---|---|---|---|---|---|---|---|
| 21 | H | H | 25 | 17 | 21 | 10 | 355 | .484 | 5.80 | 1.31 |
| 22 | CH$_3$ | CH$_3$ | 25 | 17 | 16 | 10 | 361 | .454 | 5.87 | 1.24 |
| 23 | CH$_3$ | CH(CH$_3$)$_2$ | 35 | 17 | 25 | 15 | 335 | .488 | 5.93 | 1.18 |
| 24 | H | F | 25 | 17 | 22 | 22 | 352 | — | — | — |
| 25 | H | Cl | 50* | 17 | 17.5 | 16 | — | — | — | — |
| 26 | H | CH(CH$_3$)$_2$ | 35 | 17 | 25 | 20 | 299 | .566 | 5.98 | — |
| 27 | H | C$_6$H$_5$ | 25* | 17 | 28.5 | 25 | — | — | — | — |

*Diamine is not totally soluble

TABLE 5

Polyimide Preparation from Bis(4-aminoaryl)-1-phenyl-2,2,2-trifluoroethanes

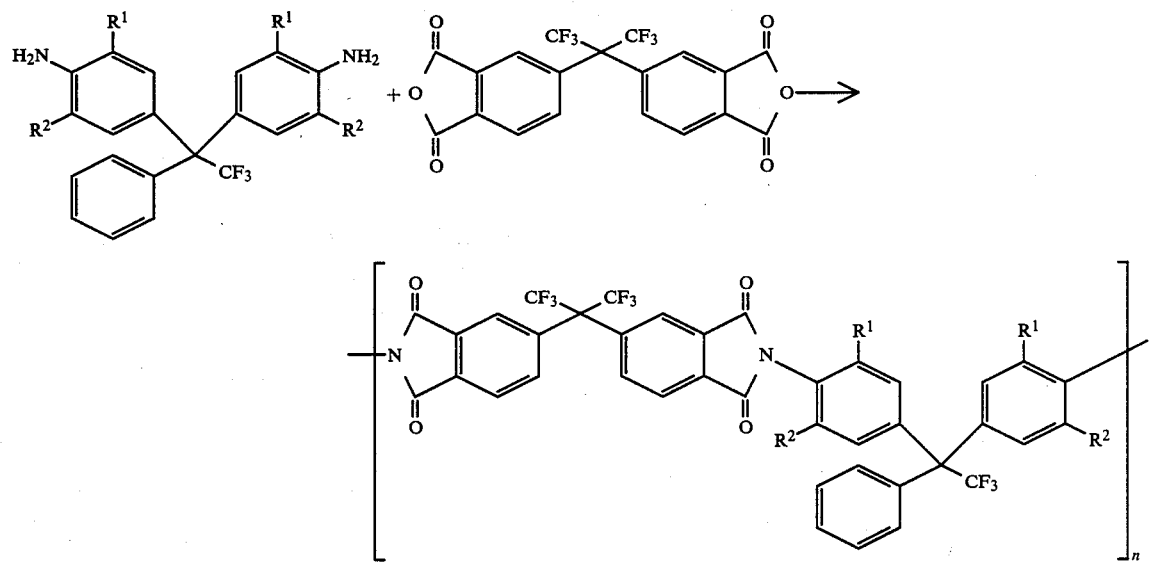

| Example | R[1] | R[2] | Initial Reaction Temp(°C.) | Polyamic Acid Reaction Time(hr) | % Solids Polyamic Acid Solution | % Solids Polyimide Solution | Polyimide Film Tg | Polyimide Film Inh. Visc. | Polyimide Film d-spacing | Polyimide Film Density |
|---|---|---|---|---|---|---|---|---|---|---|
| 28 | H | H | −10 | 17 | 16 | 10 | — | — | 5.70 | — |
| 29 | CH$_3$ | CH$_3$ | 30 | 17 | 23 | 10 | — | — | 5.87 | — |
| 30 | CH$_3$ | CH(CH$_3$)$_2$ | 25 | 65 | 18 | 15 | 289 | .455 | 6.10 | 1.20 |
| 31 | CH(CH$_3$)$_2$ | CH(CH$_3$)$_2$ | 25 | 17 | 35 | 29 | 274 | .867 | — | 1.18 |

TABLE 6

Polyimide Preparation from Alkylated Benzidines

TABLE 6-continued

[Chemical reaction scheme showing diamine + dianhydride → polyimide structure with R¹, R² substituents and CF₃ groups]

| Example | R¹ | R² | Initial Reaction Temp(°C.) | Polyamic Acid Reaction Time(hr) | % Solids Polyamic Acid Solution | % Solids Polyimide Solution | Polyimide Film Tg | Polyimide Film Inh. Visc. |
|---------|-----|-----|------|----|----|-----|------|-------|
| 32 | H | CH₃ | −10 | 17 | 20 | 10 | 352 | .874 |
| 33 | CH₃ | CH₃ | −10 | 17 | 20 | 7.5 | >375 | 1.032 |

EXAMPLES 34-40

Several membranes fabricated from various polyimides were tested for oxygen permeance (P) and $O_2/N_2$ selectivity. The specific polyimide pendant groups as well as the results of the tests are set out in Table 7 below. Example 34, wherein both R¹ and R² are H, was carried out for comparative purposes. All of the polyimides tested had the general structural formula:

EXAMPLES 41-45

Several membranes in accordance with the present invention were fabricated from various polyimides wherein a fluorenyl group was used as the diamine bridging group. As in examples 34-40 above, these membranes were tested for oxygen permeance (P) and $O_2/N_2$ selectivity. The results of these tests, along with the specific ortho diamine pendant groups are set out in Table 8 below. For comparison, two membranes were fabricated which have pendant groups outside the scope of the present invention; i.e., where R¹ and R² are H, and also where R¹ is H and R² is F; Examples 41 and 44 respectively. The membranes used in this example were formed from polyimides having polymerizable units of the formula:

TABLE 7

[Polyimide structure with CF₃ groups, R¹ and R² substituents, and CH₂ bridge]

| | DIAMINE | | | |
|---------|---------|----------|-----------|-------------|
| Example | R¹ | R² | $\bar{P}_{O_2}$ | $\alpha(O_2/N_2)$ |
| 34 | H | H | 2.70 | 4.41 |
| 35 | CH₃ | CH₃ | 11.0 | 4.17 |
| 36 | C₂H₅ | C₂H₅ | 18.4 | 4.20 |
| 37 | CH₃ | i-C₃H₇ | 30.1 | 3.82 |
| 38 | i-C₃H₇ | i-C₃H₇ | 56 | 3.68 |
| 39 | H | i-C₃H₇ | 8.21 | 5.9 |
| 40 | H | t-butyl | 19.0 | 4.70 |

The results reported in Table 7 above clearly show that membranes formed from polyimides in accordance with the present invention (having a binuclear alkylated bridging group) exhibit superior oxygen permeance than that of the membrane used for the comparative example, i.e., having a binuclear bridging group which is not alkylated as in U.S. Pat. No. 4,717,394.

TABLE 8

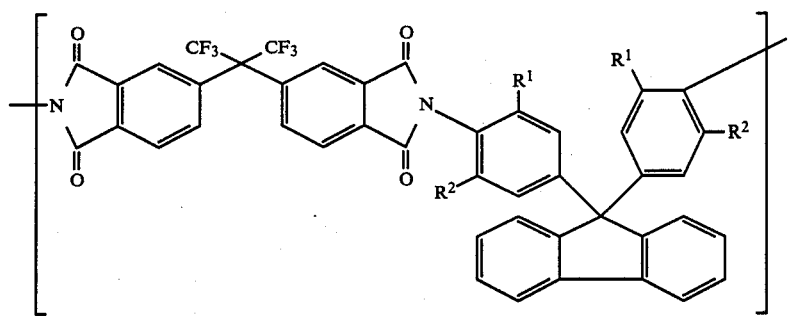

| Example | DIAMINE R¹ | R² | $\bar{P}_{O_2}$ | $\alpha(O_2/N_2)$ |
|---|---|---|---|---|
| 41 | H | H | 11.7 | 3.90 |
| 42 | $CH_3$ | $CH_3$ | 60.1 | 3.63 |
| 43 | $CH_3$ | i-$C_3H_7$ | 87.4 | 4.16 |
| 44 | H | F | 1.2 | 4.0 |
| 45 | H | i-$C_3H_7$ | 16.8 | 5.1 |

The results reported in Table 8 above show that the membranes of the present invention exhibit a much higher oxygen permeance, and in many cases greater $O_2/N_2$ selectivity than membranes formed other polyimides (Examples 41 and 44). Additionally, a comparison of the results in Table 8 with those of Table 7 show that, for polymer with similar pendant groups, oxygen permeance and $O_2/N_2$ selectivity increase for membranes formed from polyimides containing aromatic moieties in the bridging group.

EXAMPLES 46–49

Polyimide membranes in accordance with the present invention were fabricated wherein a 1-phenyl-2,2,2-trifluoroethenyl group was used as the bridging group of the diamine. The membranes were tested for oxygen permeance and $O_2/N_2$ selectivity. A comparative example, Example 46, wherein both $R^1$ and $R^2$ are H was also carried out. The results of the tests, along with the specific pendant groups are set out in Table 9 below.

The membranes used in this example were formed from polyimides having polymerizable units of the formula:

TABLE 9

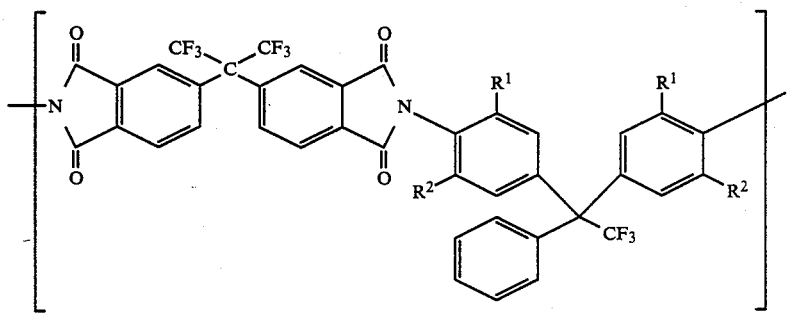

| Example | R¹ | R² | $\bar{P}_{O_2}$ | $\alpha(O_2/N_2)$ |
|---|---|---|---|---|
| 46 | H | H | 3.83 | 5.0 |
| 47 | $CH_3$ | $CH_3$ | 25.5 | 3.0 |
| 48 | $CH_3$ | CH | 57.2 | 3.5 |
| 49 | i-$C_3H_7$ | i-$C_3H_7$ | 80.0 | 3.22 |

The results reported in Table 9 show a much higher oxygen permeance for membranes formed from polyimides having pendant alkyl groups on the bridging group than for a similar polymer without pendant groups (Examples 46). For these examples, the large increase in oxygen permeance, however, was accompanied by a decrease in $O_2/N_2$ selectivity.

EXAMPLES 50–51

Polyimide membranes in accordance with the present invention were fabricated wherein a single bond was used as the diamine bridging group; i.e. a benzidene group. The membranes were tested for oxygen permeance and $O_2/N_2$ selectivity. The results of the tests, along with the specific pendant groups are set out in Table 10 below. The membranes used in this example were formed from polyimides having polymerizable units of the formula:

TABLE 10

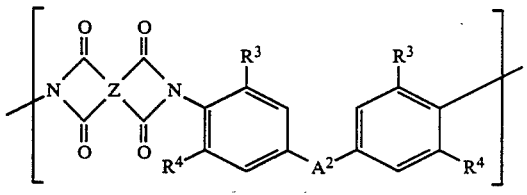

| Example | R¹ | R² | $\overline{P}_{O_2}$ | $\alpha(O_2/N_2)$ |
|---|---|---|---|---|
| 50 | H | CH₃ | 8.0 | 4.2 |
| 51 | CH₃ | CH₃ | 53.8 | 3.7 |

The results reported in Table 10 above show a marked increase in oxygen permeance when both $R^1$ and $R^2$ are alkyl groups compared to when $R^1$ is H.

In summary, the results reported above for Examples 34–51 clearly show that membranes formed from polyimides having structures in accordance with the present invention exhibit significantly superior $O_2$ permeabilities and often superior $O_2/N_2$ selectivities compared to membranes containing similar pendant groups with different bridging groups, or similar bridging groups without pendant groups.

Having thus described the present invention, what is now deemed appropriate for Letters Patent is set out in the following appended claims.

What is claimed is:

1. A semi-permeable membrane formed of a polyimide containing polymerizable units of the formula:

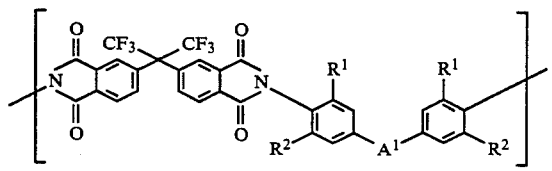

where
each $R^1$ is independently H, $C_1$–$C_6$ alkyl, or 1-arylalkyl;
each $R^2$ is independently $C_1$–$C_6$ alkyl, aryl, perhaloalkyl, or 1-arylalkyl; and
$A^1$ is a single bond,

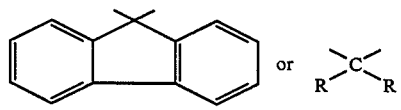

wherein
each R is independently, $CF_3$, $CF_2Cl$, $C_1$–$C_6$ alkyl, phenyl, substituted phenyl or a halogen.

2. A membrane in accordance with claim 1 wherein $A^1$ is

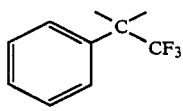

3. A membrane in accordance with claim 1 wherein $A^1$ is

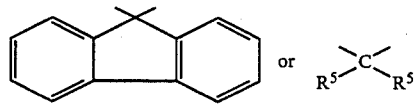

4. A membrane in accordance with claim 1 wherein said polyimide contains second polymerizable units of the formula:

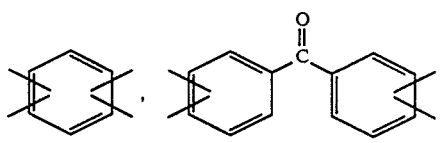

where
each $R^3$ is independently, H, $C_1$–$C_6$ alkyl, or 1-arylalkyl;
each $R^4$ is independently $C_1$–$C_6$ alkyl, aryl, perhaloalkyl, or 1-arylalkyl;
$A^2$ is a single bond

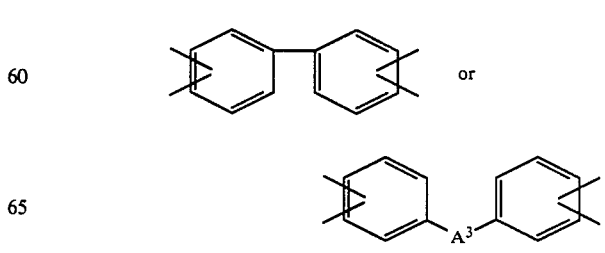

wherein
each $R^5$ is independently H, $CF_3$, $CF_2Cl$, $C_1$–$C_6$ alkyl, phenyl, substituted phenyl or a halogen; and
Z is wherein $A^3$ is $C(CH_3)_2$, O, S or $SO_2$.

5. A membrane in accordance with claim 4 wherein said second copolymerizable units make up to 95% of the total polymerizable units of the polyimide.

6. A process for separating a component of a gas mixture containing at least one other component, said process comprising: bringing said gas mixture into contact with the membrane of claim 1 whereby one component selectively permeates through said membrane.

7. A process in accordance with claim 6 wherein the gas mixture is air and oxygen selectively permeates through the membrane.

8. A process in accordance with claim 6 wherein the gas mixture contains nitrogen and oxygen.

9. A process for separating a component of a gas mixture containing at least one other component, said process comprising: bringing said gas mixture into contact with the membrane of claim 4 whereby one component selectively permeates through said membrane.

10. A process in accordance with claim 9 wherein the gas mixture is air and oxygen selectively permeates through the membrane.

11. A process in accordance with claim 9 wherein the gas mixture contains nitrogen and oxygen.

* * * * *